US007872828B1

(12) United States Patent
Sutardja et al.

(10) Patent No.: US 7,872,828 B1
(45) Date of Patent: Jan. 18, 2011

(54) FLYING HEIGHT MEASUREMENT

(75) Inventors: Pantas Sutardja, Los Gatos, CA (US); Supaket Katchmart, Campbell, CA (US); Henri Sutioso, Saratoga, CA (US); David Liaw, Newark, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 12/431,584

(22) Filed: Apr. 28, 2009

Related U.S. Application Data

(60) Provisional application No. 61/051,174, filed on May 7, 2008.

(51) Int. Cl.
*G11B 21/02* (2006.01)
*G11B 5/596* (2006.01)

(52) U.S. Cl. .................................... 360/75; 360/77.04
(58) Field of Classification Search .................. None
See application file for complete search history.

(56) References Cited

U.S. PATENT DOCUMENTS

| 4,777,544 | A  |   | 10/1988 | Brown et al.            |
|-----------|----|---|---------|-------------------------|
| 5,909,330 | A  | * | 6/1999  | Carlson et al. ... 360/31 |
| 6,408,677 | B1 | * | 6/2002  | Suzuki ........... 73/1.89 |
| 6,760,182 | B2 |   | 7/2004  | Bement et al.           |
| 6,775,091 | B1 | * | 8/2004  | Sutardja ......... 360/77.04 |
| 6,898,034 | B2 | * | 5/2005  | Dakroub et al. ... 360/31 |
| 7,092,462 | B2 | * | 8/2006  | Annampedu et al. ... 375/340 |
| 7,271,975 | B2 | * | 9/2007  | Shimizu et al. ... 360/75 |
| 7,400,464 | B1 | * | 7/2008  | Katchmart ...... 360/51   |

FOREIGN PATENT DOCUMENTS

WO       WO 98/26411 A1     6/1998

OTHER PUBLICATIONS

Suzuki, Kenji and Kurita, Masayuki, A MEMS-Based Active-Head Slider for Flying Height Control in Magnetic Recording, JSME International Journal, 2004, pp. 453-458, Series B, vol. 47, No. 3.
Schultz, Brian E., Thermal Fly-height Control (TFC) Technology in Hitachi Hard Disc Drives, www.hitachigst.com, 2006, pp. 1-4, Hitachi Global Storage Technologies, San Jose, CA.
Xu, Jianfeng, Kiely, James, Hsia, Yiao-Tee, adn Talke, Frank E., Head-Medium Spacing Measurement Using the Read-Back Signal, IEEE Transactions on Magnetics, Oct. 2006, pp. 2486-2488, vol. 42, No. 10, University of California at San Diego, La Jolla, CA.
KnowledgeTek Servo Writing, Sect 7: Position Systems, pp. 7-31 to 7-34, KnowledgeTeck, Inc.

* cited by examiner

*Primary Examiner*—K. Wong

(57) ABSTRACT

Some of the embodiments of the present disclosure provide a disk drive system comprising a disk drive system comprising a disk having a track upon a surface of the disk, the track including a first data-storing sector and a second data storing sector, and a servo sector located between the first data-storing sector and the second data-storing sector, the servo sector including a first flying height (FH) field having a predetermined pattern. Other embodiments are also described and claimed.

16 Claims, 9 Drawing Sheets

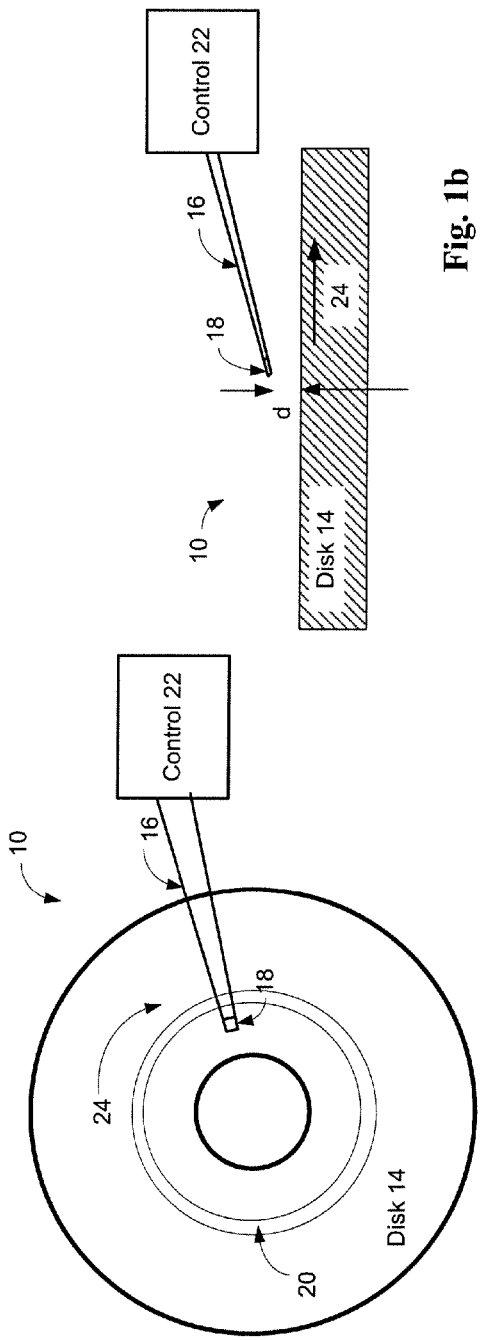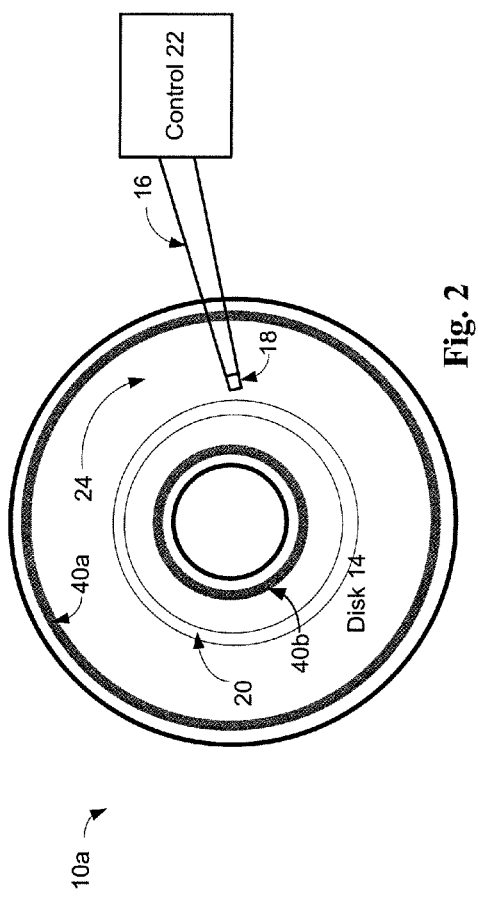
Fig. 1a
Fig. 1b
Fig. 2

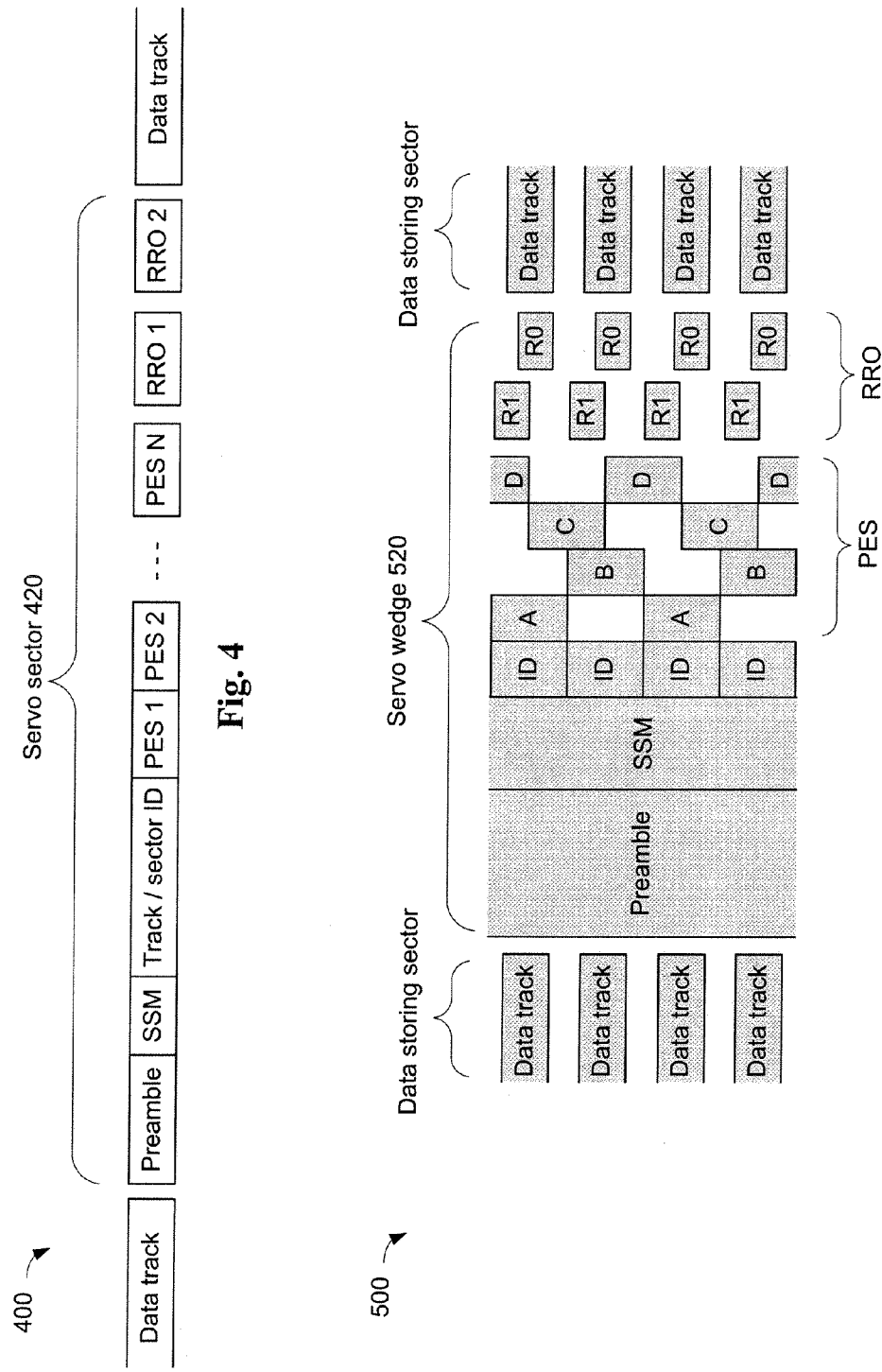

FLYING HEIGHT MEASUREMENT

CROSS REFERENCE TO RELATED APPLICATIONS

The present application claims priority to U.S. Patent Application No. 61/051,174 filed May 7, 2008, entitled "Embedded flying height measurement technique for local FH measurement" the entire specification of which is hereby incorporated by reference its entirety for all purposes, except for those sections, if any, that are inconsistent with this specification.

TECHNICAL FIELD

Embodiments of the present invention relate to storage devices, and more particularly, to disk drives.

BACKGROUND

A disk drive is a common digital data storage device. For example, magnetic hard disk drives are typically used in connection with personal computers. FIG. 1a schematically illustrates an exemplary disk drive system 10, and FIG. 1b schematically illustrates a side view of the exemplary disk drive system 10 of FIG. 1a. Referring to FIGS. 1a and 1b, the system 10 includes a magnetic disk 14, and an actuator arm assembly 16 controlled by a control unit 22. A head 18 for reading data from and/or writing data to the disk surface may be affixed at one end of the actuator arm assembly 16. A plurality of concentric tracks may be laid on the surface of the disk 14 (an exemplary track 20 is illustrated in FIG. 1a), in which data may be written to and/or from which data may be read by the head 18. During operation, the disk 14 may be rotated at a substantially constant speed in, for example, direction 24. Although not illustrated in FIGS. 1a and 1b, the system 10 may include several other components known to those skilled in the art—e.g., a spin motor to rotate the disk 14, a read channel, a write channel, and so on.

When the disk 14 is not rotating (e.g., while not in operation) or rotating at a low speed (e.g., at a beginning or an end of operation), the head 18 may be in contact with the surface of the disk 14. However, during operation, the high speed of the rotating disk may cause air to flow under the actuator arm assembly 16 and head 18, and the resulting aerodynamic force may lift the head 18 off the surface of the disk 14, as illustrated in FIG. 1b (indicated by distance d). The distance d is commonly referred to as a flying height (FH).

In various embodiments, if the head 18 is located too high from the disk surface (i.e., high flying height), the magnetic fields produced by the head 18 may not be strong enough for accurate write operation, and/or the head 18 may not be able to accurately sense magnetic characteristics on the disk surface, thereby adversely affecting a write and/or read bit error rate. On the other hand, if the head 18 is located too close to the surface of the disk 14 (i.e., low flying height), the head 18 may accidentally touch or bump the surface of the disk 14, thereby damaging the disk 14 and/or head 18. Accordingly, accurate measurement and control of the flying height of a read/write head is generally desirable.

Several methods are currently available for measuring flying height of a head in a disk drive based on, for example, measurement of signal strength, cross coupling capacitance, read head temperature, harmonic ratio, etc., as is well known to those skilled in the art. For example, Jianfeng Xu et al. ("Head-Medium Spacing Measurement Using the Read-Back Signal", IEEE Transaction on Magnetics, vol. 42, no. 10, pp 2486-2488, October 2006) and Brown et al. (U.S. Pat. No. 4,777,544, issued Oct. 11, 1988) disclose harmonic ratio flying height measurement based on a frequency ratio between two frequency domains (e.g., fundamental frequency and third harmonic frequency) of a predetermined repetitive readback voltage signal. More specifically, Jianfeng Xu et al. proposes an equation for flying height estimation, given by $$d = -\frac{3\lambda}{4\pi}\left[\ln\left(\frac{V_3}{V_1}\right) + C\right] \qquad \text{Equation 1,}$$

where d is the estimated flying height, $\lambda$ is a recording wavelength, C is a system constant, V1 and V3 are the amplitudes of the fundamental frequency and the third harmonic components, respectively, of the readback voltage signal.

The flying height measurement in Jianfeng Xu et al. and Brown et al. may be performed over a long period of time on one or more dedicated tracks (referred to herein as "flying height measurement tracks"). For example, FIG. 2 schematically illustrates an exemplary disk drive system 10a, including a disk 14 with dedicated flying height measurement tracks 40a and 40b. As illustrated in FIG. 2, the dedicated flying height measurement tracks 40a and 40b may be located at or near the inner most or outer most radius of the disk surface, although one or more flying height measurement tracks may also be imposed concentrically at any place in between the tracks 40a and 40b. Flying height measurement in Jianfeng Xu et al. and Brown et al. may be performed based on read channel circuit measurements of the fundamental and third harmonic frequencies of a read signal over the dedicated flying height measurement tracks 40a and 40b. The flying height measurement on the tracks 40a and 40b may then be assumed to be valid over all tracks and over all radial positions on the disk 14. Alternatively, the flying height of a head on a particular track (e.g., track 20) or at a particular radial position on the disk surface may be estimated by interpolating the flying height measurements of the dedicated flying height measurement tracks 40a and 40b.

However, for various reasons (e.g., uneven disk surface, variation in disk speed, etc.), the flying height of the head may not be similar over the entire disk surface or over all the tracks. Also, for different radial positions on the disk, the linear velocity of the disk may be different, which may create different amount of aerodynamic lift of the head, thereby resulting in different flying heights of the head at different radial positions. Additionally, there may be a large time difference between two flying height measurements as determined from two different flying height measurement tracks—e.g., flying height measurement tracks 40a and 40b.

Put differently, the existing flying height measurement techniques do not provide a method to measure an actual flying height at, for example, a specific track and/or at a specific radial position on the disk surface. In order to have a better control on the flying height, it may be desirable to measure the actual flying height value at any radial position and/or any track on the disk surface, rather than using approximate or interpolated flying height measurements from one or more dedicated flying height measurement tracks.

As is well known to those skilled in the art, a servo system in a hard disk drive, among other things, may enable a read/write head of the disk to follow a target track on the disk—i.e., maintain alignment of a reading or writing transducer with respect to a centerline of the target track. Several types of servo systems currently exist, including an embedded servo system that employs servo data on the same disk surface that stores user data. An embedded servo format for the disk surface may have a plurality of radially-extending servo-data regions (sometimes referred to as servo wedges) and an interspersed plurality of radially-extending user-data regions.

FIG. 3 schematically illustrates an exemplary disk 300. The disk 300 includes a disk surface 304 that is divided into a plurality of tracks in the form of concentric rings, e.g., tracks 308a, 308b, 308c, 308d, etc. In various embodiments, disk surface 304 may also be divided into a plurality of wedges, or sectors, to enable the data to be located circumferentially about the disk, e.g., data-storing sectors 312a, 312b, etc. In between adjacent data-storing sectors, there may be provided a servo wedge, e.g., servo wedge 316a between data-storing sectors 312a and 312b. The servo wedges may be used for storing servo positioning data to assist a servo circuit (not illustrated in FIG. 3) in ascertaining the current position of the head and/or aligning the head with a target track. It should be apparent that although the disk surface 304 is illustrated to have only four tracks, eight data-storing sectors and eight servo wedges (only a few of which are labeled in FIG. 3 for clarity), the disk surface 304 may have larger numbers of tracks, data-storing sectors and/or servo wedges. For example, the disk 300 may have 50, 200, 300, 600 or any other appropriate number of servo wedges.

Each of the data-storing sectors 312a, 312b, etc. may include a plurality of data tracks configured to store user data. For example, data-storing sector 312a may include datatracks 324a, 324b, 324c, 324d, etc. (only one of the datatracks, 324b, is illustrated for clarity) corresponding to tracks 308a, 308b, 308c, 308d, etc., respectively. Similarly, each of the servo wedges 316a, 316b, etc. may include a plurality of servo sectors, one for each track, configured to store servo positioning data. For example, servo wedge 316a may include servo sectors 320a, 320b, 320c, 320d, etc. corresponding to tracks 308a, 308b, 308c, 308d, etc. respectively. Thus, a servo sector of a track may be a portion of a servo wedge within the track, and may be located between data tracks in the same track. Accordingly, a single track may include a plurality of data tracks and a plurality of servo sectors.

In various embodiments, other formats of a disk may be possible. For example, although all tracks in FIG. 3 are illustrated to have the same number of data tracks and same number of servo sectors, in some embodiments, tracks that are radially inward towards the center of the disk may have a lower number of servo sectors and/or data tracks relative to those tracks that are radially further from the center of the disk.

FIG. 4 schematically illustrates a portion of an exemplary track 400 of a disk—e.g, disk 300 of FIG. 3. In various embodiments, track 400 may be any one of the plurality of concentric tracks in the disk 300 (e.g., track 308a of FIG. 3). Although track 400 may include a plurality of data tracks and a plurality of servo sectors, only portions of two data tracks, and a servo sector 420 embedded or sandwiched between the two data tracks are illustrated in FIG. 4.

As previously alluded to herein, the servo sector 420 may include one or more fields for storing servo information, which a disk head may use to synchronize and accurately position itself over the track 400 during a write and/or read operation performed on the track 400. The one or more fields of the servo sector 420 are discussed in greater detail below.

FIG. 5 schematically illustrates a section 500 of a disk surface—e.g., the disk surface 304 of disk 300 of FIG. 3. The section 500 may include a plurality of tracks, only four of which are illustrated in FIG. 5. The section 500 may also include servo wedge 520 (e.g., similar to the servo wedge 316a of FIG. 3) embedded between two data-storing sectors (e.g., similar to data-storing sectors 312a and 312b of FIG. 3). It will be apparent to those skilled in the art that only a portion of the servo wedge 520 is illustrated in FIG. 5 for purposes of clarity.

Each of the tracks illustrated in FIG. 5 may be similar to the track 400 of FIG. 4. Accordingly, referring to FIGS. 4 and 5, the servo sector 420 of FIG. 4 (or the servo wedge 520 of FIG. 5) may include a plurality of servo information fields, e.g., preamble field, servo sync mark (SSM) field, track/sector identification (ID) fields, one or more position error signal (PES) fields, and one or more repeatable run out (RRO) fields (RRO1 and RRO2, identified as R1 and R2 in FIG. 5), as is well known to those skilled in the art.

In various embodiments, the preamble field may comprise a periodic pattern which may allow a proper gain adjustment and/or timing synchronization of a read and/or write signal. The servo sync mark field may comprise special patterns for symbol synchronizing to a servo data. The track/sector ID field (identified as ID in FIG. 5) may include sector and/or track identification data of the respective servo sector, adjacent data tracks, and/or the track address. A servo control system (not illustrated in FIGS. 4 and 5) may process a read back signal of the preamble field, servo sync mark field, and/or the ID field to derive a coarse position of the head with respect to a target track.

In various embodiments, the position error signal fields may be used to more accurately align the head with the target track. The position error signal fields may include a plurality of servo positioning bursts (e.g., bursts A, B, C, and D, as illustrated in FIG. 5) for more accurate positioning of the head over the target track. As is well known to those skilled in the art, the centerline of some of the servo positioning bursts (e.g., burst A) may be aligned to the centerline of a corresponding data track, while the centerline of other servo positioning bursts (e.g., burst D) may not be aligned to the centerline of a corresponding data track. That is, one or more servo positioning bursts may have offsets with respect to a track centerline. The servo positioning bursts may be recorded at precise intervals, and fine head position control information may be derived from the servo positioning bursts for use in centerline tracking while writing data to and reading data from the target track.

In various embodiments, a repeatable runout may involve periodic deviations of the head, occurring with predictable regularity, from a target track caused by, for example, disk spindle motor runout, disk slippage, disk warping, vibrations, resonances, media defects, disk distortion due to clamping of the disk, electromagnetic imperfections due to low quality servo positioning bursts, etc. The RRO fields (e.g., R1 and R2, as illustrated in FIG. 5) may correct the head position to counter possible repeatable runouts of the head.

It will be appreciated by those skilled in the art that other servo information fields, although not illustrated in FIGS. 4 and 5, may also be present in a servo sector. In various other embodiments, one or more of the servo information fields (e.g., the RRO fields) may be absent from the servo sector of FIGS. 4 and 5.

The servo sector 420 and/or servo wedge 520 may be written on a disk during manufacturing of the disk. For example, in various embodiments, the preamble field, servo sync mark field, track/sector identification field, and/or one or position error signal fields (including the servo positioning bursts) may be written on the disk during manufacturing using a conventional stitch writing technique. Once these fields are written to the disk, calibration tests may be performed on the disk, based on which the RRO fields may be written on the disk.

SUMMARY

In various embodiments, the present disclosure provides an apparatus and a method for flying height measurement. More specifically, there is provided, in accordance with various embodiments of the present invention, a disk drive system comprising a disk having a track upon a surface of the disk, the track including a first data-storing sector and a second data storing sector and a servo sector located between the first data-storing sector and the second data-storing sector, the servo sector including a first flying height (FH) field having a predetermined pattern. The disk drive system may also comprise a head configured to generate a read back signal based on the predetermined pattern in the first flying height field, and a distance calculation module to determine a flying height of the head over the track based on the read back signal.

There is also provided, in accordance with various embodiments of the present invention, a system for detecting a flying height (FH) of a head over a disk, the system comprising a frequency detection module configured to receive read back signals of a plurality of flying height fields included in the disk, and further configured to output magnitudes of fundamental frequencies and third harmonic frequencies of the read back signals corresponding to each of the flying height fields, a qualifier module configured to selectively qualify read back signals of one or more flying height fields, and further configured to output magnitudes of fundamental frequencies and third harmonic frequencies of qualified read back signals, and an averaging module configured to receive the output of the qualifier module, and further configured to output a first signal indicative of a moving average of magnitudes of fundamental frequencies of the qualified read back signals, and to output a second signal indicative of a moving average of magnitudes of third harmonic frequencies of the qualified read back signals.

There is also provided, in accordance with various embodiments of the present invention, a method comprising forming a plurality of concentric tracks on a disk, forming a plurality of servo sectors on each of the plurality of concentric tracks, and forming one or more dedicated flying height (FH) fields in one or more of the plurality of servo sectors, thereby forming a plurality of dedicated FH fields in the disk, wherein the plurality of dedicated FH fields are configured to enable measurement of a distance between a read/write head and the disk surface.

There is also provided, in accordance with various embodiments of the present invention, a method comprising receiving read back signals corresponding to a plurality of flying height (FH) fields included in a disk, detecting magnitudes of fundamental frequencies and third harmonic frequencies of the read back signals corresponding to each of the flying height fields, selectively qualifying read back signals of one or more of the flying height fields, outputting magnitudes of fundamental frequencies and third harmonic frequencies of qualified read back signals, and determining moving averages of the magnitudes of fundamental frequencies and third harmonic frequencies of the qualified read back signals.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

FIG. 1a schematically illustrates an exemplary disk drive system.

FIG. 1b schematically illustrates a side view of the exemplary disk drive system of FIG. 1a.

FIG. 2 schematically illustrates an exemplary disk drive system, with two dedicated flying height measurement tracks.

FIG. 4 schematically illustrates a portion of an exemplary track of the disk of FIG. 3.

FIG. 5 schematically illustrates a section of a disk surface of the disk of FIG. 3.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use the phrases "in an embodiment," or "in embodiments," which may each refer to one or more of the same or different embodiments. The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B"

means (A), (B), or (A and B), similar to the phrase "A and/or B." The phrase "at least one of A, B and C" means (A), (B), (C), (A and B), (A and C), (B and C) or (A, B and C). The phrase "(A) B" means (B) or (A and B), that is, A is optional.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 6A:
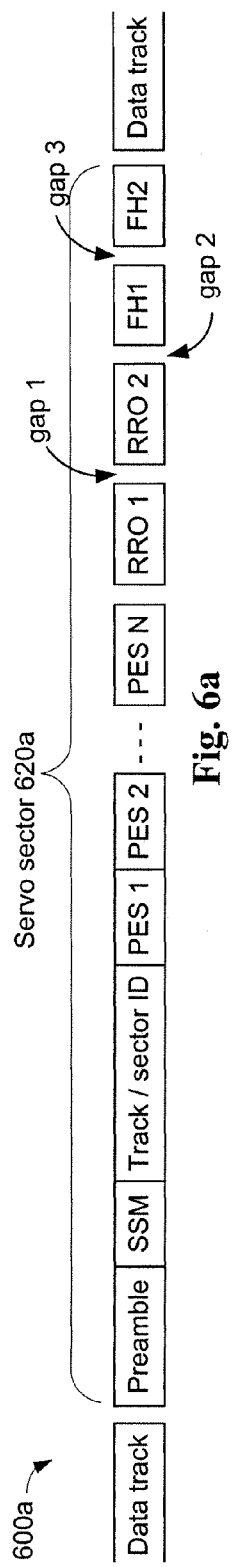
FIG. 6a schematically illustrates a portion of an exemplary track of a disk, in accordance with various embodiments of the present invention.

FIG. 6a schematically illustrates a portion of an exemplary track 600a of a disk in accordance with various embodiments of the present invention. In various embodiments, similar to the track 400 of FIG. 4, the track 600a of FIG. 6a includes a servo sector 620a embedded between two data tracks, and includes one or more fields for storing servo information, which a disk head may use to synchronize and accurately position itself over the track 600a during a write and/or read operation performed on the track 600a.

Figure 7A:
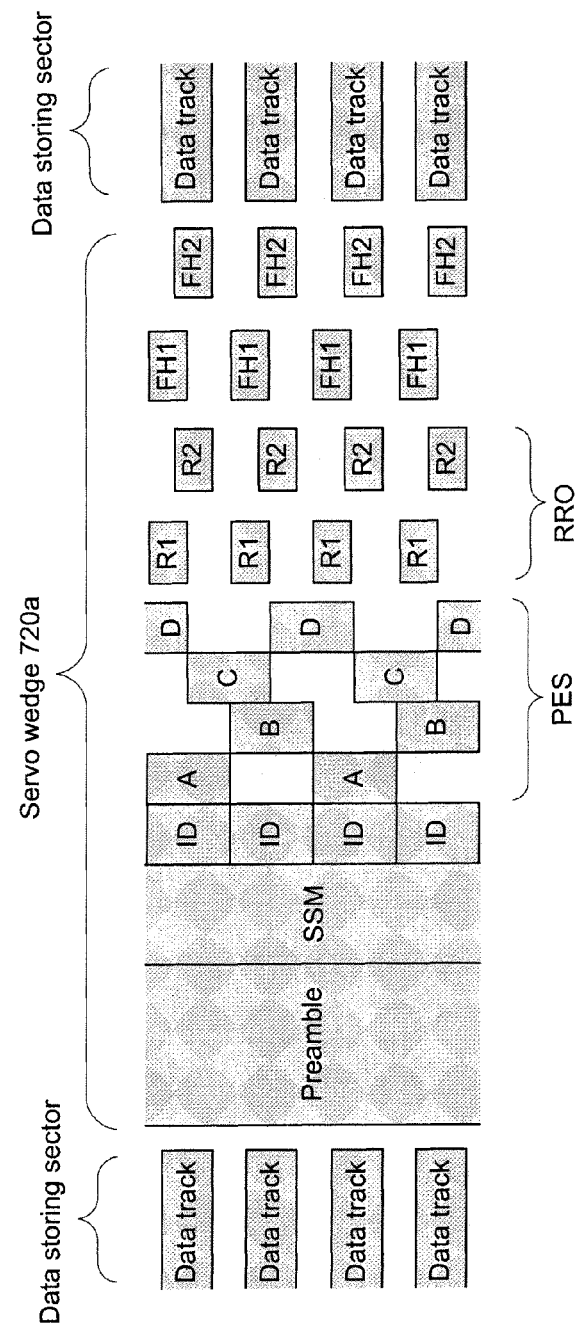
FIG. 7a schematically illustrates an exemplary section of a surface of a disk, in accordance with various embodiments of the present invention.

FIG. 7a schematically illustrates an exemplary section 700a of a surface of a disk including a plurality of tracks (e.g., track 600a of FIG. 6a), in accordance with various embodiments of the present invention. In various embodiments, similar to the section 500 of FIG. 5, the section 700a of FIG. 7a includes a servo wedge 720a embedded between two data-storing sectors (note: only a portion of the servo wedge 720a is illustrated in FIG. 7a). Each data storing sector includes a plurality of data tracks (e.g., four data tracks, as illustrated in FIG. 7a).

In various embodiments, the servo sector 620a of FIG. 6a (or the servo sectors of the servo wedge 720a of FIG. 7a) may include a plurality of servo information fields, e.g., a preamble field, a servo sync mark (SSM) field, a track/sector ID field, one or more position error signal (PES) fields, and/or one or more RRO fields (e.g., RRO1 and RRO2), as has been previously discussed herein.

In various embodiments, the servo sector 620a of FIG. 6a (or the servo sectors of the servo wedge 720a of FIG. 7a) may also include one or more flying height (FH) measurement fields (referred to herein as FH fields), illustrated as FH1 and FH2. In various embodiments, the FH fields in a servo sector may be utilized for real time measurement of the flying height at the position of the servo sector (i.e., for measuring a distance between the head and the disk surface when the head is over the servo sector).

As previously discussed, a disk surface may include a plurality of tracks, in which each track includes a plurality of servo sectors. Put differently, the disk may include a plurality of servo wedges, each servo wedge including a plurality of servo sectors (each servo sector corresponding to a track). Thus, in various embodiments, one or more of the servo sectors in the disk may include one or more FH fields, as illustrated in FIGS. 6a and 7a. In various embodiments, each of the servo sectors of the disk may include one or more FH fields.

Although each of the servo sectors of the exemplary embodiments of FIGS. 6a and 7a includes two FH fields, in other embodiments, a servo sector may include a different number of FH fields (e.g., one FH field, three FH fields or more).

Figures 6B, 7B:
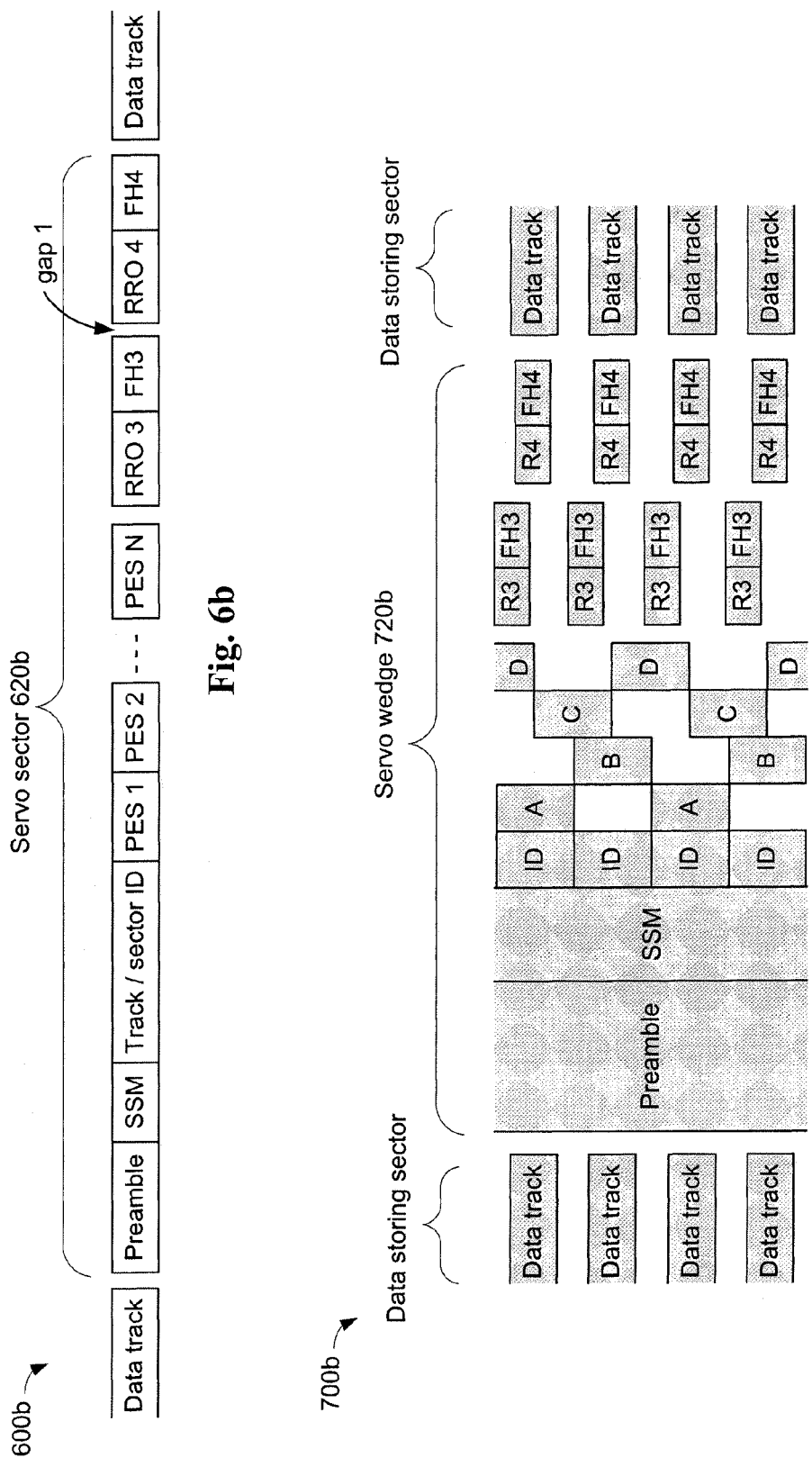
FIG. 6b schematically illustrates a portion of another exemplary track of a disk, in accordance with various embodiments of the present invention.
FIG. 7b schematically illustrates another exemplary section of a surface of a disk, in accordance with various embodiments of the present invention.

FIG. 6b schematically illustrates a portion of an exemplary track 600b of a disk, in accordance with various embodiments of the present invention, and FIG. 7b schematically illustrates an exemplary section 700b of a surface of a disk, including a plurality of tracks (e.g., track 600b of FIG. 6b), in accordance with various embodiments of the present invention.

In various embodiments, track 600b and section 700b of FIGS. 6b and 7b may be at least in part similar to the track 600a and the section 700a of FIGS. 6a and 7a, respectively. That is, each of the servo sectors in FIGS. 6b and 7b may include one or more FH fields (e.g., FH3 and FH4). However, the position of the FH fields (e.g., FH3, FH4) and the RRO fields (e.g., RRO2, RRO4) in FIGS. 6b and 7b may be different than the positions of the FH fields (e.g., FH1, FH2) and the RRO fields (e.g., RRO1, RRO2) illustrated in FIGS. 6a and 7a.

For example, in various embodiments, in FIGS. 6a and 7a, the two RRO fields (RRO1 and RRO2) may be adjacent, and the two FH fields (FH1 and FH2) may be adjacent to the two RRO fields. In contrast, in FIGS. 6b and 7b, the RRO fields and FH fields within a given track are interleaved—e.g., the FH3 field is embedded between the RRO3 field and the RRO4 field, and the FH4 field is adjacent to the RRO4 field. Other patterns of RRO fields and FH fields are possible.

In various embodiments, in FIGS. 6b and 7b, the FH3 field may be stitched to the RRO3 field (i.e., substantially zero gap between the two fields), and the FH4 field may be stitched to the RRO4 field, e.g., during manufacturing of the disk. Thus, in various embodiments, in the servo sectors of FIGS. 6b and 7b, only one gap (illustrated as gap 1 in FIG. 6b) may exist between the RRO and the FH fields. In contrast, in the servo sector 620a of FIG. 6a, three gaps (illustrated as gap 1, gap 2 and gap 3 in FIG. 6a) may exist between the RRO fields and the FH fields. Thus, the servo sectors of FIGS. 6b and 7b may require less spacing as compared to the servo sectors of FIGS. 6a and 7a. In various embodiments, none of the FH fields in FIGS. 6b and 7b may be stitched to any other servo information fields and/or adjacent data tracks. In these embodiments, for example, the FH3 and the RRO3 fields (and/or the FH4 and RRO4 fields) may not be stitched.

Also, in the servo sectors of FIGS. 6a and 7a, the length of the FH fields may not affect the latency of the RRO fields. On the other hand, in the servo sectors of FIGS. 6b and 7b, the length of FH3 may affect the latency of the RRO fields (as FH3 may be embedded in between the RRO fields).

Referring to FIG. 7a, in various embodiments, a centerline of one of the FH fields (e.g., FH1) in each servo sector may be aligned with a centerline of an RRO field (e.g., RRO1), and the centerline of another FH field (e.g., FH2) may be aligned with the centerline of the other RRO field (e.g., RRO2). Also, in various embodiments, the centerline of one of the RRO fields (e.g., RRO2 field) may be aligned with the centerline of adjacent data tracks while the center line of another of the RRO fields (e.g., RRO1 field) may be offset with respected adjacent data track. In various embodiments, one of the FH fields (e.g., FH2) may be aligned with the centerline of adjacent data tracks, and the other FH field (e.g., FH1) may be offset with respect to the centerline of adjacent data tracks. Accordingly, the centerlines of the two FH fields may have an offset.

Similarly, in FIG. 7b, RRO3 and FH3 fields may be aligned, and RRO4 and FH4 fields may be aligned. In various embodiments, the centerline of the RRO4 and FH4 fields may be aligned to the centerline of the associated data tracks, although in various other embodiments (not illustrated in FIG. 7b) the centerline of the RRO3 and FH3 fields may be aligned to the centerline of the associated data tracks. Additionally, the centerlines of the two FH fields (FH3 and FH4) may have an offset, as illustrated in FIG. 7b.

The offset between the two FH fields of a servo sector may result in accurate flying height measurement both during a read and a write operation. For example, in various embodiments, the desired alignment of the head, with respect to the centerline of a target data track, may not be the same during a read and a write operation. Accordingly, having two misaligned FH fields may ensure that the head is aligned to at least one of the FH fields during both a read operation and a write operation of a target data track. Also, the offset among the FH fields, along with the fact that the FH fields are not stitched to any neighboring data tracks and/or to any other servo fields (except the RRO fields), may ensure that a frequency harmonic spectrum of the FH fields (discussed in greater detail below) is not affected by stitching and/or radial incoherence effects.

Although FIGS. 6a, 6b, 7a and 7b illustrate the FH fields associated with a corresponding RRO field, in various embodiments, a servo sector including one or more FH fields may not include any RRO fields. Also, in various embodiments, the configuration of the FH fields and/or the RRO fields may be different from that illustrated in FIGS. 6a, 6b, 7a and/or 7b.

As illustrated in the figures, the FH fields may be placed at one end of a servo sector. Thus, the head may traverse over the other servo information fields (e.g., preamble, SSM, ID, PES, and one or more RRO fields) in a servo sector before reaching a FH field. This may ensure that the data sampling points are already substantially aligned to the servo fields by the time the head passes over the FH fields, thereby ensuring a relatively more accurate FH measurement.

Referring again to FIGS. 6a, 6b, 7a, and 7b, in various embodiments, the FH fields may include at least a fundamental frequency and a higher order harmonic (e.g., third harmonic) frequency data pattern, such that the read back signal of the FH fields return more than one frequency (e.g., the fundamental and one or more higher order harmonics). For example, in various embodiments, a FH field may include a simple symmetric pattern such as 11110000 or an asymmetric pattern such as 111100, although any other appropriate pattern may also be possible.

In various embodiments, a FH field may include a periodic pattern with a relatively low fundamental frequency. For example, the fundamental frequency of a FH field may be 1/6, 1/8, 1/12, 1/16 or 1/24 of a sampling frequency (Fs). The low fundamental frequency may ensure that the third harmonic (or any higher order harmonic) frequency is not too high. In various embodiments, the fundamental frequency may be chosen such that the third harmonic frequency may be below a Nyquist frequency (which may be half the sampling frequency, i.e., ½ Fs). Accordingly, in various embodiments, the fundamental frequency may be less than ⅙ of the sampling frequency Fs.

Figure 8:
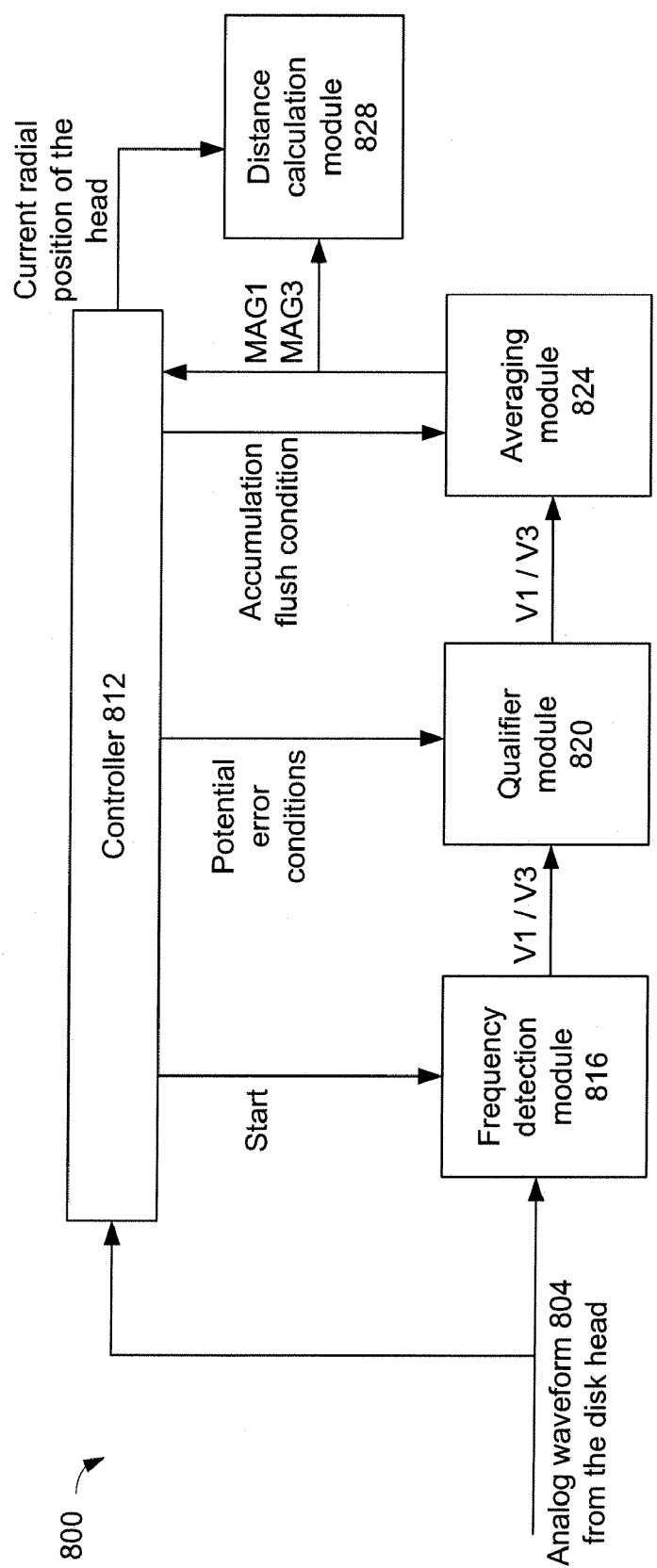
FIG. 8 schematically illustrates an exemplary flying height measurement system, in accordance with various embodiments of the present invention.

FIG. 8 schematically illustrates an exemplary flying height measurement system 800, in accordance with various embodiments of the present invention. In various embodiments, although not illustrated in FIG. 8, the system 800 may be part of a hard disk drive that includes a disk, an actuator arm assembly, a head positioned on the actuator arm assembly, and several other components known to those skilled in the art. The disk may have a plurality of tracks, each track including a plurality of servo sectors, as previously discussed in more detail herein. Additionally, in various embodiments, one or more servo sectors within a given track may include one or more FH fields, as illustrated in FIGS. 6a, 6b, 7a and/or 7b.

In various embodiments, the system 800 may receive an output (e.g., an analog waveform 804) from the head of the disk. Thus, the waveform 804 may include read data from the head, and accordingly, may include read back signals associated with one or more FH fields (of FIG. 7a or 7b), as read by the head while the head passes over the one or more FH fields.

For example, during a read or a write operation, if the head is positioned over a target track, the head may read back the contents of one or more servo sectors included in the track. One or more of the servo sectors may include one or more FH fields corresponding specifically to the track, the head may also read the data patterns included in the FH fields and pass the read back signals to the system 800 within waveform 804.

In various embodiments, while passing over a servo sector, the head and/or the system 800 may detect when the head passes over the associated servo sync mark field. As the position of the FH fields in the servo sector may be known relative to the position of the servo sync mark field, the head and/or the system 800 may also detect the FH fields and identify the data read back from the FH fields.

In various embodiments, the system 800 may include a controller 812 configured to control one or more operations of the associated disk drive, including the head and the disk. For example, the system 800 may be configured to sense the analog read back waveform, control the rotation of the disk and/or the movement of the head over the disk, and/or control operations of a servo system (not illustrated in FIG. 8) responsible for accurate positioning of the head over a target track.

In various embodiments, the system 800 may also include a frequency detection module 816 that may receive read back signals associated with one or more FH fields, and output the magnitudes of fundamental frequencies (e.g., V1) and higher order harmonics (e.g., third order harmonic V3) from the read back signals of the FH fields. In various embodiments, the frequency detection module 816 may perform a Fourier transform on the waveform 804 to generate the magnitudes V1 and V3.

As FH measurement values usually change gradually over a radial position on a disk, an appropriate averaging technique (e.g., a moving average) may be utilized to further improve the flying height measurement accuracy.

For example, for one complete rotation of the disk, the head may pass over a plurality of servo sectors of a track, and accordingly, may read the FH fields of the plurality of servo sectors within the track. In various embodiments, to have a relatively more accurate flying height measurement, the reading of the FH fields of different servo sectors within the track may be averaged (e.g., through a moving average window), as will be discussed in more detail herein later.

Additionally, not all read back signals of the FH fields may be accurate. For example, read back signals of one or more FH fields may be subject to relatively more noise, and it may be desirable to eliminate or disqualify relatively inaccurate read back signals while averaging and calculating a FH measurement value (flying height of the head).

Referring again to FIG. 8, the system 800 may include a qualifier module 820, which may be configured to sense relatively inaccurate or potentially erroneous read backs signals, and eliminate or disqualify these readings from subsequent averaging and FH value calculation, and qualify only those read back signals that the controller 812 and/or the qualifier module 820 deems satisfactory for averaging and FH value calculation. For example, in various embodiments, the controller 812 may transmit information about these inaccurate or potentially erroneous read back signals of one or more FH fields to the qualifier module 820, based on which the qualifier module 820 may perform said selective qualification of read back signals.

In various embodiments, such disqualification and/or qualification may be based at least in part on one or more of a plurality of factors. For example, if the magnitude of the fundamental frequency of the FH field read back data is less than a programmable threshold magnitude, it may be an indication of the head not being properly aligned over the target track. In various embodiments, if the read data of a servo sector does not include RRO sync mark detection, it may be an indication that a servo detector has a difficulty in detecting a data pattern in a RRO field, which may potentially adversely affect readings of the associated FH fields. The position error signal fields in a servo sector may be used as a fine positioning signal that indicates the precise position of the read head. Thus, in various embodiments, if read back position error signal values exceed a threshold boundary, it may be an indication that the read head may be relatively far off from the target track. As FH measurement values are usually expected to change gradually with the rotation of the disk, in various embodiments, an abrupt change in the FH field read back signals may potentially indicate an inaccurate detection. Several other failure flags may also be based on Thermal Asperity (TA), predetermined bad servo sector, missing servo sync mark, signal saturation flag, etc.

In various embodiments, one or more of these indications may be used, alone or in conjunction, by the controller 812 and/or the qualifier module 820, to selectively disqualify, ignore or eliminate a read back signal of a FH field and/or to selectively qualify another FH field read back value. In various embodiments, for example, the controller 812 may transmit a potential error condition and/or an error flag to the qualifier module 820 to indicate one or more of such error conditions, based on which the qualifier module 820 may perform said selective qualification.

Referring again to FIG. 8, in various embodiments, the system 800 may also include an averaging module 824 that may receive the fundamental and the third harmonic frequencies of qualified FH field read back signals. In various embodiments, the averaging module 824 may accumulate the received data and calculate a moving average of the fundamental and the third harmonic frequencies of qualified FH field read back signals. Calculation of moving average is well known to those skilled in the art, and hence, a detailed description is not presented here. In various embodiments, the averaging module 824 may output the moving averages of the magnitudes of the fundamental and the third harmonic frequencies (illustrated as MAG1 and MAG3 in FIG. 8) of qualified FH field read back signals to the controller 812 and/or to a distance calculation module 828 included in system 800.

In various embodiments, for different radial distances of the disk, the linear velocity of the disk may be different, which may create different amount of aerodynamic lift of the disk head, resulting in different flying heights for different radial positions. Thus, the FH measurement value may change gradually with a change in the radial position of the disk. Also, a change in radial position may change a recording density of the medium, which may also change the shape of channel impulse response and affect the frequency ratio between two harmonic frequencies of the FH field read back signal.

Thus, the previously discussed moving average for flying height measurement may be relatively accurate if there is a gradual radial movement of the disk head with respect to the center of the disk. However, an abrupt change in the radial position of the head (which may occur, for example, due to disk seeking, where the head may rapidly move from one radial position to another) may result in relatively erroneous measurement of the FH measurement value.

Accordingly, in various embodiments, it may be desirable to initialize the moving average in the averaging module 824 in response to detecting an abrupt change in the radial position of the head. In various embodiments, the controller 812 may issue an accumulation flush condition flag to the averaging module 824 in response to such detection, based on which a moving average buffer (not illustrated in FIG. 8) in the averaging module 824 may be flushed and the moving average initialized. In various embodiments, the output (MAG1 and MAG3) of the averaging module 824 may be suspended until a reasonable number of samples (i.e., read back signals of a reasonable number of FH fields) are collected to minimize an error in flying height measurement.

Referring again to FIG. 8, once the distance calculation module 828 receives the moving averages of the magnitudes (MAG1 and MAG2) of the two frequencies of the qualified read back signals, the distance calculation module 828 may compute the FH measurement value using one of several techniques known to those skilled in the art. For example, in various embodiments, the FH measurement value may be calculated from MAG1 and MAG2 utilizing the previously described equation 1. In various embodiments, the controller 812 may also communicate a current radial position of the head to the distance calculation module 828 so that the distance calculation module 828 can correctly calculate A and C of Equation 1. Alternatively, the controller 812 may calculate and communicate the values of A and C of Equation 1 to the distance calculation module 828. A significant or abrupt change in the head radial position may negatively affect calculation of the value of C. However, as previously discussed herein in more detail, the flying height measurement, in the event of such an abrupt change, is suspended, thereby making obsolete any resultant error in calculating the value of C.

Figure 9:
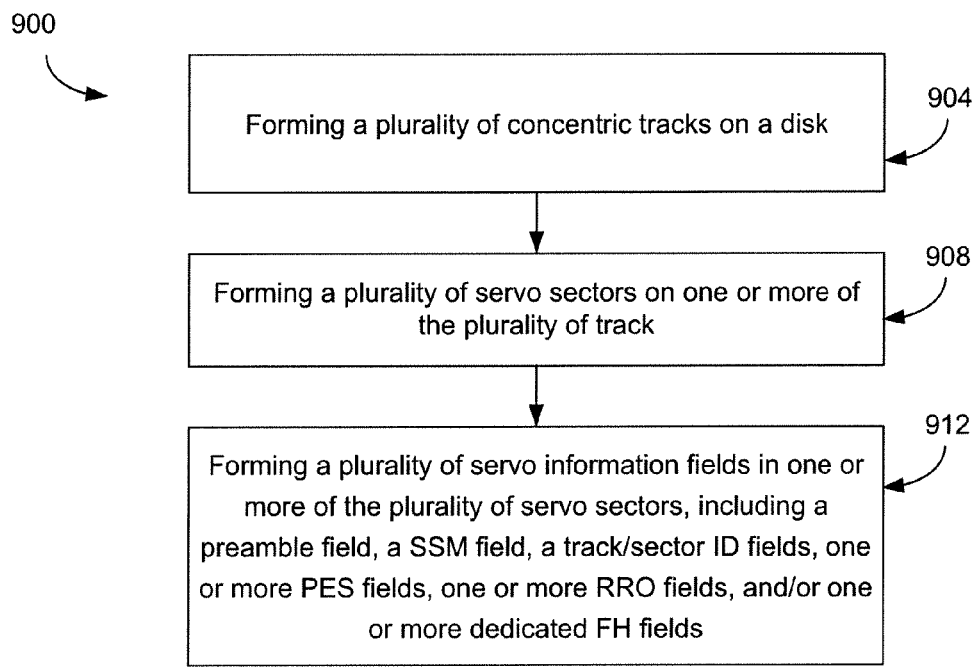
FIG. 9 illustrates an exemplary method for forming a disk including one or more dedicated flying height fields, in accordance with various embodiments of the present invention.

FIG. 9 illustrates an exemplary method 900 for forming a disk including one or more FH fields, in accordance with various embodiments of the present invention. In various embodiments, method 900 may include, at 904, forming a plurality of concentric tracks on a disk (e.g., disk 300 of FIG. 3). At 908, a plurality of servo sectors (e.g., similar to the servo sectors of FIGS. 6a and/or 6b) may be formed on one or more (e.g., each) of the plurality of tracks. In various embodiments, the method 900 may further include, at 912, forming a plurality of servo information fields in one or more (e.g., each) of the plurality of servo sectors, including a preamble field, a servo sync mark field, a track/sector ID fields, one or more position error signal fields, one or more RRO fields, and/or one or more FH fields, as has been previously discussed in detail herein. In various embodiments, the plurality of dedicated FH fields may be configured to enable measurement of a distance between a read/write head and the disk surface.

Figure 10:
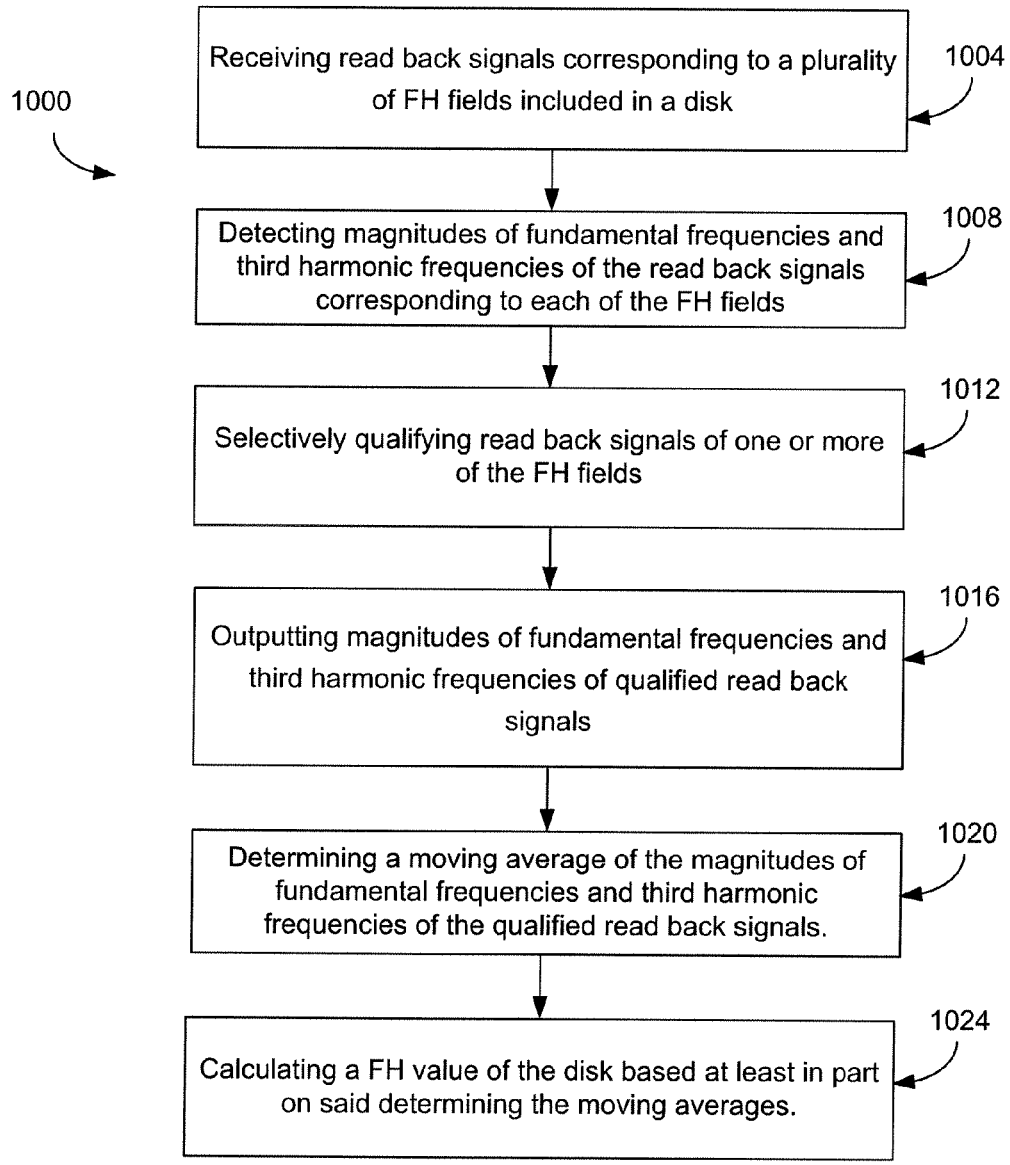
FIG. 10 illustrates an exemplary method for measuring flying height values, in accordance with various embodiments of the present invention.

FIG. 10 illustrates an exemplary method 1000 for determining a flying height (FH measurement value) of a head over a disk, in accordance with various embodiments of the present invention. In various embodiments, the method 1000 may be practiced on a disk (e.g., disk 300 of FIG. 3) including a plurality of tracks, each track including a plurality of servo sectors (e.g., similar to the servo sectors of FIGS. 6a and/or 6b). In some implementations, one or more of the servo sectors within a given track includes one or more FH fields, as has been previously discussed in more detail herein. Some of the operations of the method 1000 may be performed by one or more components of system 800 of FIG. 8.

Referring to FIGS. 3, 6a, 6b, 8 and 10, in various embodiments, the method 1000 may include, at 1004, receiving read back signals corresponding to a plurality of FH fields included in a disk. For example, the frequency detection module 816 of FIG. 8 may receive said read back signals. At 1008, the frequency detection module 816 may detect magnitudes of fundamental frequencies and third harmonic frequencies of the read back signals corresponding to each of the FH fields.

At 1012, the qualifier module 820 may selectively qualify read back signals of one or more of the FH fields based at least in part on possibly receiving an error flag from the controller 812 indicating a potential error in a read back signal of a FH field. At 1016, the qualifier module 820 may output magnitudes of fundamental frequencies and third harmonic frequencies of qualified read back signals.

At 1020, the averaging module 824 may determine and output moving averages of the magnitudes of fundamental frequencies and third harmonic frequencies of the qualified read back signals. Although not illustrated in FIG. 10, the method 1000 may also include detecting an abrupt change in a radial position of the read/write head (if such change occurs at any time), receiving an accumulation flush condition signal that is generated in response to said detecting the abrupt change, and initializing said moving average, in response to receiving said accumulation flush condition signal, by flushing out a current value stored in a moving average buffer.

At 1024, the distance calculation module 828 may calculate a FH value of the disk based at least in part on the moving averages determined at 1020 using, for example, the previously discussed equation 1. Although not illustrated in FIG. 10, the method 1000 may also include receiving, by the distance calculation module 828, a current radial position of the head, determining the previously discussed constants $\lambda$ and C, and calculating the FH value based at least in part on said determining the constants $\lambda$ and C.

Figure 11:
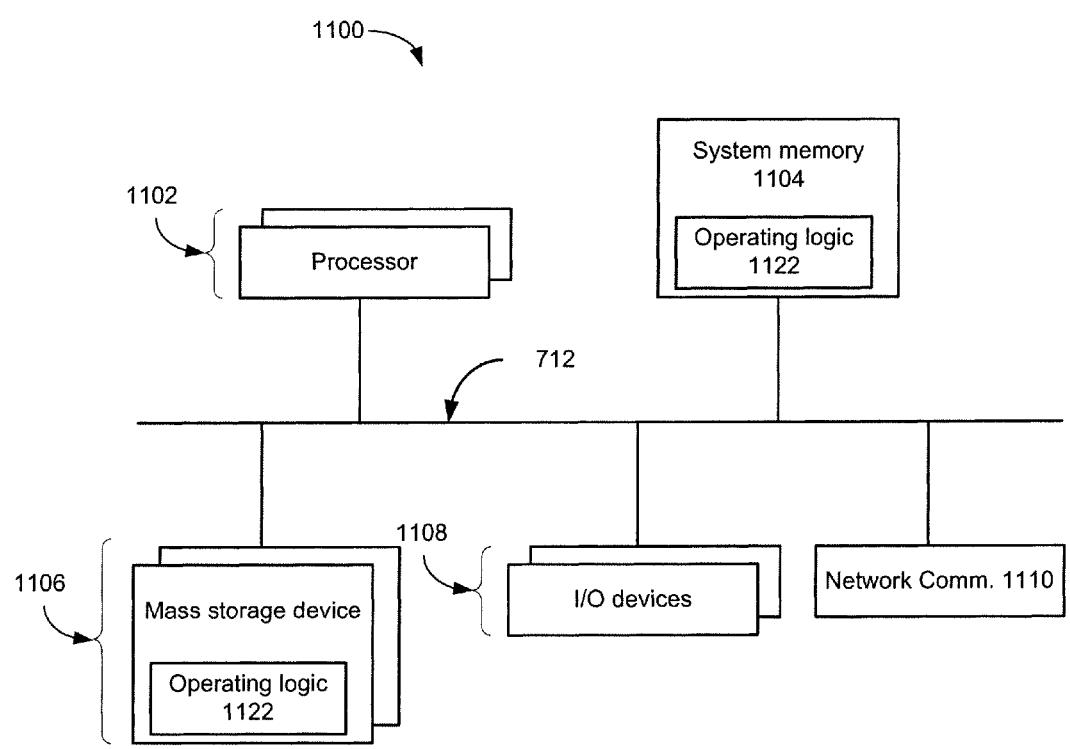
FIG. 11 is a block diagram of an exemplary system 1100 suitable for use to practice the present invention, in accordance with various embodiments of the present invention.

FIG. 11 is a block diagram of an exemplary system 1100 suitable for use to practice the present invention, in accordance with various embodiments of the present invention. As illustrated, system 1100 may include one or more processors or processor cores 1102, and system memory 1104. For the purpose of this application, including the claims, the terms "processor" and "processor cores" may be considered synonymous, unless the context clearly requires otherwise. Additionally, system 1100 may include one or more mass storage devices 1106 (such as diskette, hard drive, compact disc read only memory (CDROM) and so forth), input/output devices 1108 and communication interfaces 1110 (such as network interface cards, modems and so forth). The elements of FIG. 11 may be coupled to each other via system bus 1112, which may represent one or more buses. In the case of multiple buses, they may be bridged by one or more bus bridges (not illustrated).

Each of these elements performs its conventional functions known in the art. In particular, system memory 1104 and mass storage 1106 may be employed to store a working copy and a permanent copy of the programming instructions implementing all or a portion of earlier described functions, herein collectively denoted as 1122. The instructions 1122 may be assembler instructions supported by processor(s) 1102 or instructions that can be compiled from high level languages, such as C.

The permanent copy of the programming instructions may be placed into permanent storage 1106 in the factory, or in the field, through, for example, a distribution medium (not shown), such as a compact disc (CD), or through communication interface 1110 (from a distribution server (not shown)). That is, one or more distribution media having instructions 1122 may be employed to distribute the instructions 1122 and program various client devices. The constitution of these elements 1102-1112 are generally well known, and accordingly will not be further described.

Figure 3:
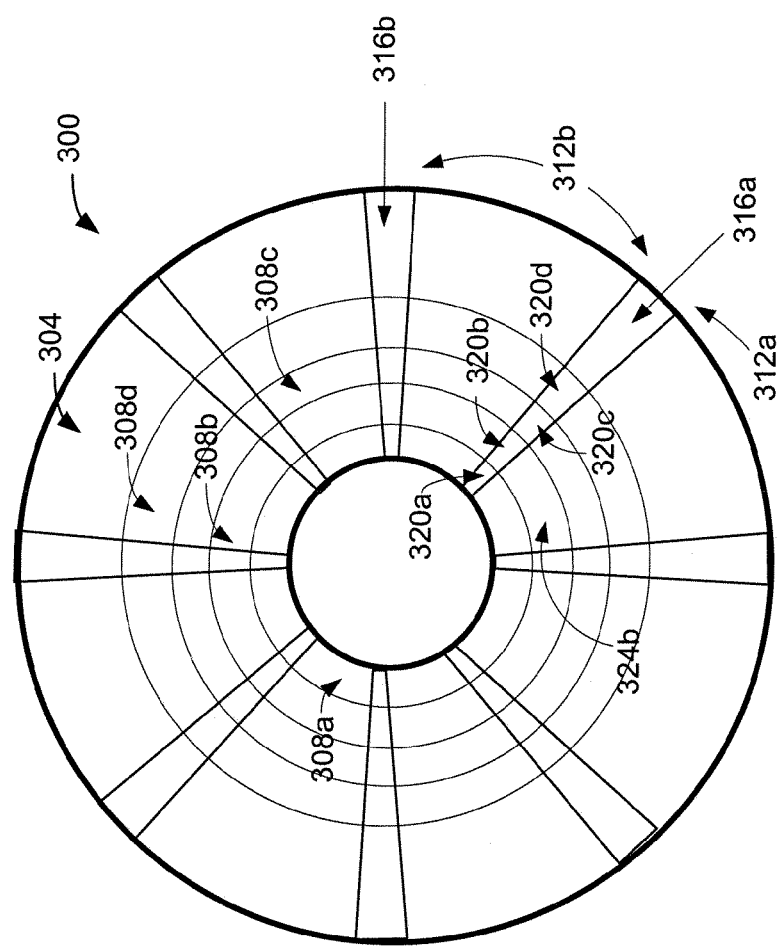
FIG. 3 schematically illustrates an exemplary disk.

In various embodiments, the one or more mass storage devices 1106 may include a hard disk drive, including a hard disk similar to the disk 300 of FIG. 3. In various embodiments, the hard disk may include a plurality of tracks. One or more of the tracks can include one or more servo sectors, and one or more of the servo sectors can include one or more FH fields, as illustrated in FIGS. 6a, 6b, 7a and/or 7b. In various embodiments, the system 1100 may also include a FH measurement system, similar to the system 800 of FIG. 8. The FH measurement system may be coupled to the hard disk drive (or be a part of the hard disk drive) and may be utilized to measure FH values of the hard disk. In various embodiments, the system memory 1104, operating logic 1122, and/or the one or more mass storage devices 1106 may include programming instructions configured to operate or control one or more components of the FH measurement system.

Although specific embodiments have been illustrated and described herein, it will be appreciated by those of ordinary skill in the art and others, that a wide variety of alternate and/or equivalent implementations may be substituted for the specific embodiment illustrated and described without departing from the scope of the present invention. This present invention covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware. This application is intended to cover any adaptations or variations of the embodiment discussed herein. Therefore, it is manifested and intended that the invention be limited only by the claims and the equivalents thereof.

What is claimed is:

1. A disk drive system comprising:
   a disk having a track upon a surface of the disk, the track including
      a first data-storing sector and a second data storing sector; and
      a servo sector located between the first data-storing sector and the second data-storing sector, the servo sector including a first flying height field and a second flying height field, the first flying height field and the second flying height field each having a predetermined pattern;
   a head configured to generate a read back signal based on the predetermined pattern in the first flying height field and the predetermined pattern in the second flying height field; and
   a distance calculation module to determine a flying height of the head over the track based on the read back signal.

2. The disk drive system of claim 1, wherein the servo sector further comprises a first repeatable run out (RRO) field.

3. The disk drive system of claim 2, wherein a centerline of the first flying height field is offset with respect to a centerline of the second flying height field.

4. The disk drive system of claim 2, wherein the repeatable run out field is located between the first flying height field and the second flying height field.

5. The disk drive system of claim 2, wherein the servo sector further includes a preamble field, a servo sync mark field, a track/sector identification field, and a position error signal field.

6. The disk drive system of claim 1, wherein the disk drive system comprises a hard disk drive.

7. The disk drive system of claim 1, further comprising:
a frequency detection module configured to (i) receive the read back signal and (ii) output magnitudes associated with a fundamental frequency and third harmonic frequency of the read back signal.

8. The disk drive system of claim 7, further comprising:
a controller configured to transmit a current radial position of the head to the distance calculation module, wherein the distance calculation module uses the current radial position of the head to determine the flying height of the head over the track.

9. A system for detecting a flying height (FH) of a head over a disk, the system comprising:
a frequency detection module configured to
receive read back signals of a plurality of flying height fields included in the disk, and
output magnitudes of fundamental frequencies and third harmonic frequencies of the read back signals corresponding to each of the flying height fields;
a qualifier module configured to
selectively qualify read back signals of one or more flying height fields, and
output magnitudes of fundamental frequencies and third harmonic frequencies of qualified read back signals; and
an averaging module configured to
receive the output of the qualifier module,
output a first signal indicative of a moving average of magnitudes of fundamental frequencies of the qualified read back signals, and
output a second signal indicative of a moving average of magnitudes of third harmonic frequencies of the qualified read back signals.

10. The system of claim 9, further comprising:
a distance calculation module configured to calculate the flying height of the head over the disk based at least in part on the first signal and the second signal; and
a controller configured to transmit a current radial position of a head to the distance calculation module to enable the distance calculation module to calculate the flying height of the head over the disk.

11. The system of claim 9, further comprising:
a controller configured to
transmit an error flag to the qualifier module to enable the qualifier module to perform said selective qualification, and
transmit an accumulation flush condition signal to the averaging module in response to determining an abrupt change in a radial position of the head,
wherein the averaging module is further configured to initialize said moving average, in response to receiving said accumulation flush condition signal, by flushing out a current value stored in a moving average buffer included in the averaging module.

12. A method comprising:
forming a plurality of concentric tracks on a disk;
forming a plurality of servo sectors on each of the plurality of concentric tracks; and
forming at least two dedicated flying height (FH) fields in each of one or more of the plurality of servo sectors, thereby forming a plurality of dedicated FH fields in the disk, wherein the plurality of dedicated FH fields are configured to enable measurement of a distance between a read/write head and a surface of the disk.

13. The method of claim 12, further comprising:
forming one or more servo information fields in one or more of the plurality of servo sectors, including a preamble field, a servo sync mark field, a track/sector identification fields, one or more position error signal fields, and/or one or more repeatable run out fields.

14. A method comprising:
receiving read back signals corresponding to a plurality of flying height (FH) fields included in a disk;
detecting magnitudes of fundamental frequencies and third harmonic frequencies of the read back signals corresponding to each of the flying height fields;
selectively qualifying read back signals of one or more of the flying height fields;
outputting magnitudes of fundamental frequencies and third harmonic frequencies of qualified read back signals; and
determining moving averages of the magnitudes of fundamental frequencies and third harmonic frequencies of the qualified read back signals.

15. The method of claim 14, further comprising:
calculating a flying height value based at least in part on the moving averages of the magnitudes of fundamental frequencies and third harmonic frequencies of the qualified read back signals.

16. The method of claim 14, wherein selectively qualifying read back signals of one or more of the flying height fields further comprises:
receiving an error flag indicating a potential error in a read back signal of a flying height field;
selectively disqualifying a detected magnitude of a fundamental frequency and a third harmonic frequency of the read back signal of the flying height field for which the error flag was received; and
selectively qualifying a detected magnitude of a fundamental frequency and a third harmonic frequency of a read back signal of a flying height field for which no error flag has been received.

* * * * *